Figure 1:
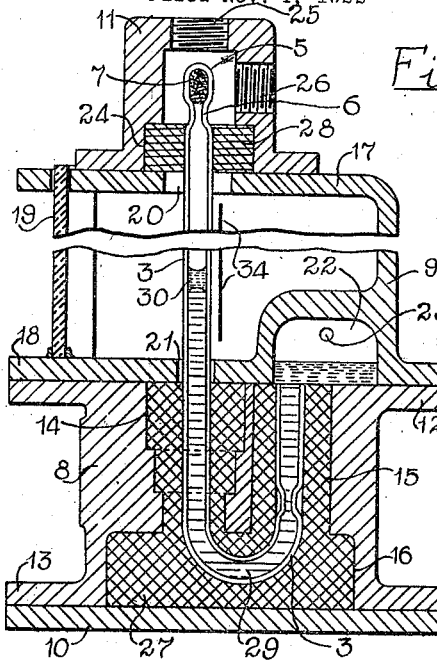

Sept. 16, 1924.

A. E. L. SCANES 1,509,033

CONDENSER EFFICIENCY GAUGE

Filed Nov. 4, 1922  2 Sheets-Sheet 1

Inventor:-
Arthur E. L. Scanes
By: [signature]
Attorney.

Inventor:-
Arthur E. L. Scanes
By James L. Norris
Attorney.

Patented Sept. 16, 1924.

1,509,033

UNITED STATES PATENT OFFICE.

ARTHUR EDWIN LEIGH SCANES, OF ASHTON-ON-MERSEY, ENGLAND.

CONDENSER-EFFICIENCY GAUGE.

Application filed November 4, 1922. Serial No. 599,041.

*To all whom it may concern:*

Be it known that I, ARTHUR EDWIN LEIGH SCANES, a subject of the King of Great Britain, and a resident of Ashton-on-Mersey, in the county of Chester, England, have invented a new and useful Condenser-Efficiency Gauge, of which the following is a specification.

In the specification of Letters Patent No. 1,217,074, a gauge is described for indicating directly the vacuum efficiency or condenser efficiency of a steam condenser in which liquid in a sealed indicating tube is maintained at the desired temperature by immersing the tube in a container or surrounding it by a jacket through which either condensed steam water or the cooling water of the circulating system of the condenser is caused to pass. Gauges constructed in this way have been found to possess the disadvantage that, after prolonged use, the glass of the container or jacket becomes obscured by impurities deposited from the water circulated therethrough and difficulty is experienced in reading the indications given by variations in the height of the liquid in the sealed tube.

The present invention relates to gauges of the above indicated type and has for its object to provide an improved gauge of that type in which the above mentioned disadvantage is overcome and which at the same time is simple and cheap to construct. To the attainment of this end the invention consists in locating within the sealed upper end of the gauge tube a liquid absorbing substance, such for instance as a sponge, which, when the gauge is put into operative condition, is soaked with water and providing means for communicating the heat in the condensed steam water or of the cooling water of the circulating system of the condenser, in connection with which the gauge is to be used, to the exterior of the portion of the sealed indicating tube containing said liquid absorbing substance in such a manner that the portion of said tube wherein variations in level of the liquid occur during the normal operation of the gauge is not obscured or obstructed in any way. Said means may assume various forms.

For example, the condensed steam water or cooling water of the condenser may be caused to flow through a jacket surrounding the upper part only of the sealed indicating tube of the gauge in which the porous liquid absorbing substance is located. Alternatively, the entire gauge or a portion thereof may be enclosed in an air tight container made either of transparent material or provided with a window or peep-hole, and the condensed steam water or cooling water may be caused to flow through a suitable coil so disposed within said container as not to obstruct at least one portion of the indicating tube and thus permit the variations of the level of the liquid in the tube to be clearly observed through the transparent container or the peep-hole provided therein. In some cases I may use both these arrangements concurrently, the water being caused to pass through the coil before or after it is passed through the jacket at the top of the gauge tube.

The use of a coil as described has the further effect of maintaining the sealed indicating tube of the gauge at a suitable temperature and so preventing the condensation of vapour on the inner wall thereof.

With a gauge constructed in accordance with this invention I find it convenient to also provide means whereby the liquid may be caused to rise to the top of the sealed end of the indicating gauge tube when desired. This, for example, may be accomplished by providing a cock or the like whereby the vacuum which normally exists in that part of the gauge which is connected to the vacuum space of the condenser, when in operation may momentarily be broken. Some provision of this nature is desirable in order that, if all the liquid should evaporate from the porous absorbent material in the gauge tube and should recondense on the surface of the liquid in the gauge tube, such re-condensed liquid may be re-absorbed by the porous material at the top of the gauge tube by causing the liquid in the latter to rise therein, the gauge being thereafter easily and quickly restored to its operative condition.

In order that the invention may be more clearly understood and readily carried into practice, reference will now be made to the accompanying drawings wherein two constructional forms thereof are illustrated by way of example; Fig. 1 being a vertical section through one form, Fig. 2 a similar view through the other form, Fig. 3 a diagram showing a gauge such as is illustrated by Fig. 1 connected up with a jet condenser, and Fig. 4 a diagram showing a similar gauge connected up with a surface condenser.

In each form illustrated the gauge comprises a U-tube 3 of glass or other transparent material disposed within a container 4. The U-tube has its long leg hermetically sealed at 5 and has a constricted portion 6 forming with the sealed end a pocket for the reception of a sponge or other absorbent substance 7. The container 4 comprises a base portion 8, a casing 9, a bottom cover 10 and a jacket 11. The base portion 8 is in the form of a substantially cylindrical body provided with top and bottom flanges 12 and 13 and having chambers 14 and 15 and a passageway 16 connecting the chambers 14 and 15, all cast or otherwise formed in said base portion; the casing 9 is of cylindrical formation having top and having bottom flanges 17 and 18 and a glass or other transparent window 19 in the wall thereof, central openings 20 and 21 being provided in the flanges 17 and 18, respectively, while the latter has also a pocket 22 provided with a port 23 cast or otherwise formed in the underside thereof; the bottom cover 10 consists of a simple disc or blank flange adapted to be bolted or otherwise secured to the flange 13; and the jacket 11 consists of a cylindrical dome internally recessed at 24 and having water inlet and outlet ports 25 and 26 therein.

The lower end of the U-tube 3 extends through the chambers 14 and 15 in the base portion 8 with the open end of its short leg flush with the top of the flange 12 and its bent portion in the passageway 16 and is secured in position by wax or other suitable material 27 poured into said chambers and passageway and allowed to set, the whole being secured against displacement by the bottom cover 10. The casing 9 is bolted or otherwise secured to the base portion 8 with the interior of the pocket 22 communicating with the interior of the short leg of the U-tube 3 and with the long leg of the latter passing through the openings 20 and 21 in the top and bottom flanges thereof. The upper portion of the U-tube containing the sponge or other absorbent substance 7 which projects above the flange 17 is surrounded by the jacket 11. A number of india rubber or other suitable washers 28, located in the recess 24 and surrounding the tube, effect a water tight joint between the interior of the jacket 11 and the casing 9.

The tube 3 is exhausted of air, and mercury 29 together with sufficient water to soak the absorbent substance 7 and form a thin layer 30 between said absorbent substance and the mercury, is inserted in said tube.

Figure 2:
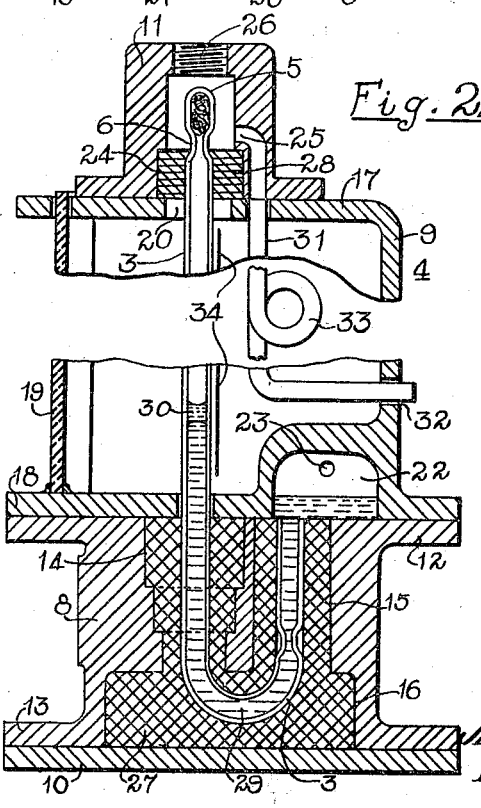

In the form illustrated by Fig. 2 the casing 9 is preferably air-tight and a pipe 31 communicating at one end with the water inlet port 25 in the jacket 11 and at the other end with an inlet port 32 in the casing 9 and having one or more coils 33 intermediate its ends is located adjacent the long leg of the U-tube 3.

Figure 3:
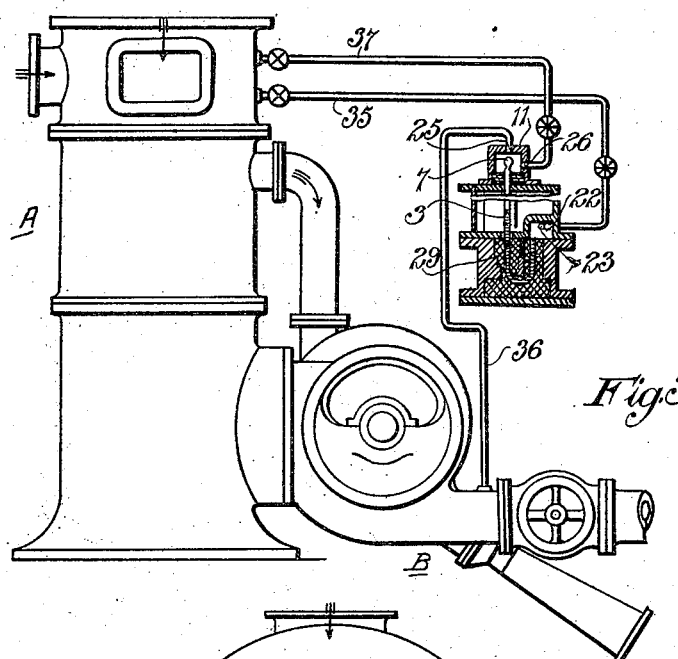

When the gauge is used to indicate the vacuum efficiency of a jet condenser as indicated in Fig. 3, the port 23 is connected by means of a pipe 35, with the vacuum space of the condenser A and the water inlet 25 and water outlet 26 are respectively connected with a bye-pass 36 from the condenser hot well pump B and a return pipe 37 also connected with the vacuum space of the condenser A. This arrangement causes a vacuum corresponding to that within the condenser A to exist above the mercury in the pocket 22 and discharge water from the pump B to flow through the jacket 11 and maintain the temperature of the water in the absorbent substance 7 at substantially the temperature of the discharge water from the condenser. In operation, a pressure will be generated in the sealed end of the tube 3 due to the vapour tension of the water therein which will correspond to the theoretically possible vacuum within the condenser. The difference of pressure within the long leg of the U-tube and the pocket 22 will cause the mercury 29 to take up a definite position and the variations in level of the mercury in the long leg of the U-tube 3 will be a measure of the vacuum efficiency of the condenser.

Figure 4:
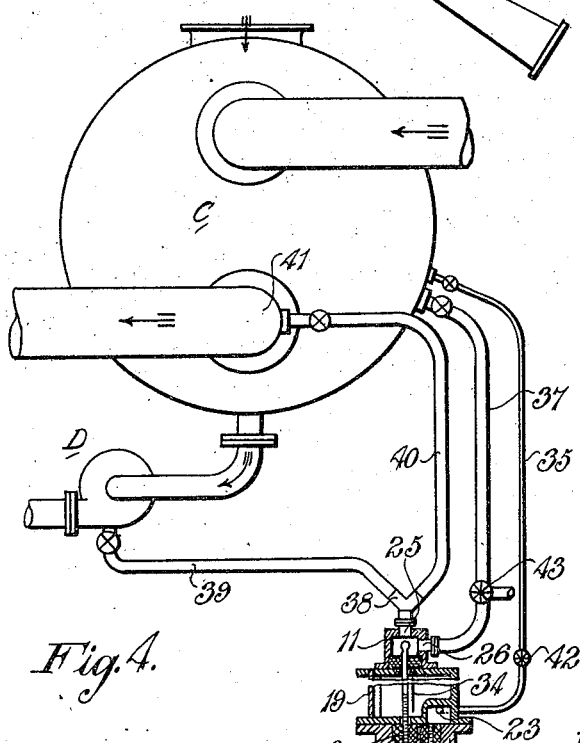

When the apparatus is to be used with a surface condenser C, as illustrated by Fig. 4, a two-way branch 38 is preferably provided in connection with the inlet port 25, the branches of which are connected by means of pipes 39 and 40 respectively with the delivery of the extraction pump D and the discharge pipe 41 of the circulating system while the ports 23 and 26 are respectively connected by means of pipes 35 and 37 with the vacuum space of the condenser as before. With this arrangement water can be circulated through the jacket 11, or pipe 33 and jacket 11, as the case may be, either from the hot well of the condenser or from the discharge of the cooling water circulating system. When this water is supplied from the hot well the gauge will indicate the vacuum efficiency in the same manner as when the device is used with a jet condenser and when it is supplied from the discharge of the circulating water the gauge will indicate directly the condenser efficiency, the water being discharged respectively to the vacuum space of the condenser by way of the pipe 37 or to any convenient region where a lower pressure than that obtaining in the pipe 41 exists by way of a two way cock 43 in the pipe 37. A scale 34 graduated so as to give direct readings of the vacuum and condenser efficiencies may be provided adjacent the sealed leg of the U-tube.

In each form illustrated means such as a two-way cock 42 in the pipe 35 connecting the port 23 with the vacuum space of the condenser may be provided by which the vacuum in the pocket 22 may be temporarily broken so that in the event of all the liquid evaporating from the porous substance 7 and recondensing on the surface of the mercury 29, such liquid may be again brought into contact with the absorbent substance 7 by opening the container 22 to atmospheric pressure.

In a modification of the form of the invention illustrated by Fig. 2, the sealed leg of the U-tube 3 may be located entirely within the casing 9 and the jacket 11 dispensed with. In this case the coils 33 would preferably be located in the vicinity of the absorbent substance 7 and may conveniently surround it.

Although several constructional forms have been described by way of illustration or example, the invention is not limited to these forms but may be varied as desired within the limits imposed by the succeeding claims.

I claim as my invention:

1. A gauge of the character stated comprising a tube adapted to contain liquid and having one end sealed and the other end open, means whereby the open end of said tube is liquid sealed, liquid absorbing substance in the sealed end of the tube and means through which fluid can be circulated in thermal association with the portion of the tube containing the liquid absorbing substance.

2. A gauge of the character stated comprising a tube adapted to contain liquid and having one end sealed and the other end open, means whereby the open end of said tube is liquid sealed, liquid absorbing substance in the sealed end of the tube and a jacket having fluid inlet and outlet ports therein surrounding the portion of the tube containing the liquid absorbing substance.

3. A gauge of the character stated comprising a U-shaped tube adapted to contain liquid and having legs of unequal length, the longer leg being sealed and the shorter leg open, liquid absorbing substance in the sealed leg of the tube, and means through which fluid can be circulated in thermal association with the portion of the tube containing the liquid absorbing substance.

4. A gauge of the character stated comprising a U-shaped tube adapted to contain liquid and having one leg sealed and the other leg open, liquid absorbing substance in the sealed leg of the tube, a jacket having fluid inlet and outlet ports therein surrounding the portion of the tube containing the liquid absorbing substance, and a casing having at least a portion of its wall transparent surrounding an intermediate portion of the sealed leg of the U-tube.

5. A gauge of the character stated comprising a U-shaped tube adapted to contain liquid and having one leg sealed and the other leg open, liquid absorbing substance in the sealed leg of the tube, a jacket having fluid inlet and outlet ports therein surrounding the portion of the tube containing the liquid absorbing substance, a casing having at least a portion of its wall transparent surrounding an intermediate portion of the sealed leg of the tube, and means for circulating fluid in thermal association with the interior of said casing.

6. A gauge of the character stated comprising a U-shaped tube adapted to contain liquid and having one leg sealed and the other leg open, liquid absorbing substance in the sealed leg of the tube, a jacket having fluid inlet and outlet ports therein surrounding the portion of the tube containing the liquid absorbing substance, a casing having at least a portion of its wall transparent surrounding an intermediate portion of the sealed leg of the tube and a coiled pipe through which fluid can be circulated disposed within said casing with its ends communicating respectively with the exterior of the casing and the inlet port of the aforesaid jacket.

7. The combination with a fluid condenser of a tube containing liquid and having one end sealed and the other end connected with the vacuum space of said condenser, means whereby the latter end of said tube is liquid sealed, liquid absorbing substance in the sealed end of the tube and means for maintaining the portion of the tube containing said liquid absorbing substance at substantially the temperature of the condensate from the condenser.

8. The combination with a fluid condenser of a tube containing liquid and having one end sealed and the other end connected with the vacuum space of said condenser, means whereby the latter end of said tube is liquid sealed, liquid absorbing substance in the sealed end of the tube and means for circulating fluid from the condenser in thermal association with the portion of the tube containing said liquid absorbing substance.

9. The combination with a steam condenser of a U-shaped tube having one leg sealed and the other leg in communication with the vacuum space of said condenser, liquid absorbing substance containing water in the sealed leg of the tube, a column of mercury in the bent portion of the tube, and means for maintaining the portion of the tube containing said liquid absorbing substance at substantially the temperature of the condensate from the condenser.

10. The combination with a steam condenser of a U-shaped tube having one leg sealed and the other leg in communication with the vacuum space of said condenser, liquid absorbing substance containing water in the sealed leg of the tube, a column of mercury in the bent portion of the tube and means whereby liquid from the condenser can be circulated in thermal association with the portion of the tube containing the liquid absorbing substance.

11. The combination with a steam condenser of a U-shaped tube having one leg sealed and the other leg in communication with the vacuum space of said condenser, liquid absorbing substance adapted to contain water in the sealed leg of the tube, means for maintaining the portion of the tube containing said liquid absorbing substance at substantially the temperature of the condensate from the condenser, and means whereby the open end of the tube can be placed in communication with a region of higher pressure than that obtaining in the vacuum space of the condenser.

In testimony whereof I have hereunto subscribed my name this twenty-third day of October, 1922.

ARTHUR EDWIN LEIGH SCANES.